Aug. 15, 1933.   M. O. JENSEN   1,922,049
DIRECT READING MANOMETER
Filed Feb. 23, 1932
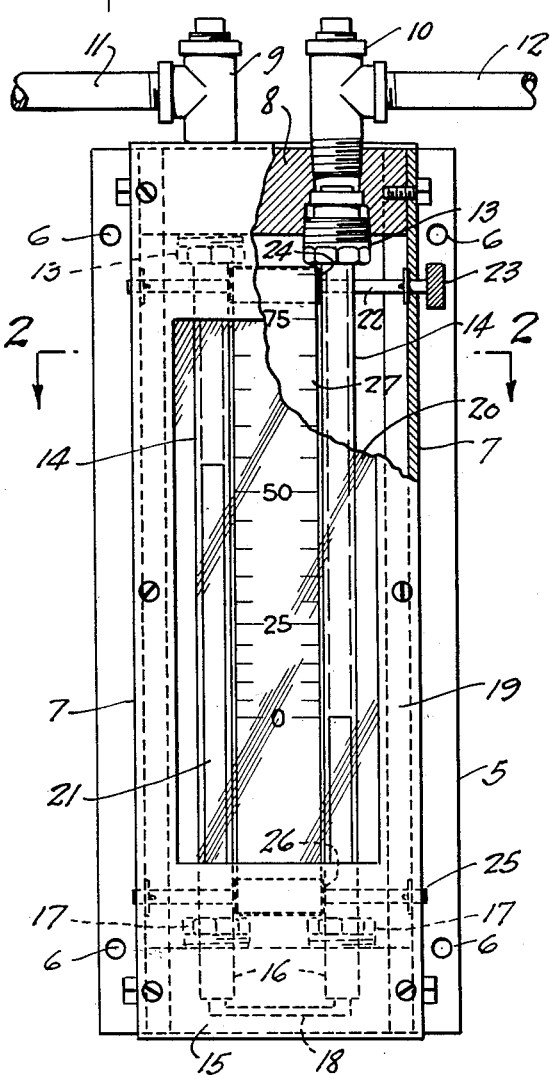
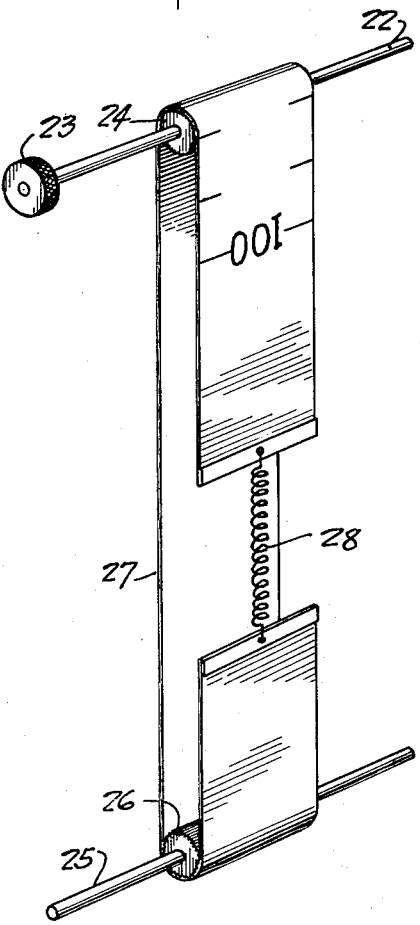
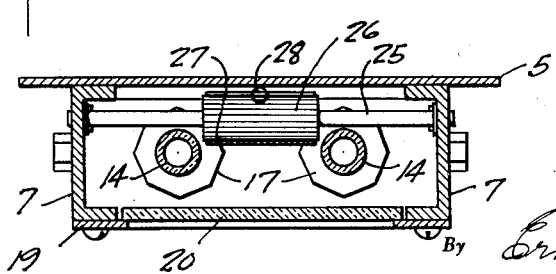
Inventor
Milton O. Jensen
By Ernest L. Wallace
Attorney Patented Aug. 15, 1933

1,922,049

UNITED STATES PATENT OFFICE 1,922,049

DIRECT READING MANOMETER

Milton O. Jensen, Huntington Park, Calif.

Application February 23, 1932. Serial No. 594,448

5 Claims. (Cl. 73—31)

This invention relates to a manometer for indicating pressures or differences in pressures of fluids. It comprises a pair of sight gauge limbs connected to form a U gauge and having an indicating fluid in the limbs. Between the limbs is a scale for taking readings of the position of the levels of the indicating fluid. Heretofore, it has been the common practice to provide either a stationary scale or one which may be raised or lowered a limited distance to adjust its zero position, which zero position is disposed to be intermediate the levels of the indicating liquid in the limbs or at the common levels when the pressure in the limbs is equal. The difference in levels is calculated by adding the readings of the limbs on opposite sides of the zero point. Further calculations may be then resorted to in order to reduce the reading to terms in units of the ultimate character desired. However, addition of the readings on opposite sides of the zero point are required. The present invention appertains to a manometer of the character described having a scale movable to position the zero point so that a direct reading may be made of the difference in levels of the indicating fluid. The scale is so arranged that the zero point may be positioned anywhere on the display face. In addition to the broader objects of this invention there are certain details of structure involving invention which will be apparent from the subjoined specification and claims.

In the drawing forming a part of this specification:

Fig. 1 is a front elevation of a gauge partly in section; Fig. 2 is a section as seen on the line 2—2 of Fig. 1; Fig. 3 is a rear perspective view of the scale and roller mounting.

Referring with more particularity to the drawing, the manometer comprises a frame having a back plate 5 with openings 6 for reception of screws or the like to secure the manometer to a support such as a wall. Secured to the sides of the plate are channel bars 7. Disposed between the channel bars 7 at the top is a metal block 8. Spaced bores extend through the block and are threaded for mounting therein fittings 9 and 10 adapted to be secured to pipes 11 and 12 leading to the sources of pressure to be measured. Packing nuts 13 are threaded in the bores and are adapted to receive sight tubes 14 preferably formed of glass. Extending between the lower ends of the channel bars 7 is a lower block 15 having spaced bores 16 disposed in alinement with the bores in the upper block and adapted to receive packing nuts 17 similar to 13 for mounting the lower ends of the sight tubes 14. Extending between the bores 16 is a cross passage 18 completing with the sight tubes a U gauge structure. A face plate 19 holds a glass 20 forming a window in the frame for viewing the tubes. A column of mercury 21 provides the indicating fluid by which differences in pressures may be read. The differences in pressure are read from the differences in level of the mercury column in the sight tubes.

Journalled in the channel bars 7 adjacent the upper rail is a shaft 22 having a knurled head 23 at one end and a roller 24 intermediate its ends. Journalled in the channel bars 7 at the lower end of the frame is a shaft 25 carrying a roller 26. The roller 26 is an idler roller. Passed over rollers 24 and 26 is a strip 27 having indicia thereon by which to read the differences in levels of the column. The strip is arranged to form an endless band passing over the rollers by a tension spring 28 joining the ends of the strip together. The endless band is held taut on the rollers due to the resiliency of the spring. In order to read the difference in levels directly, the head 23 is grasped and turned to bring the zero point opposite the level of the shorter leg. The difference in levels is directly indicated by the reading of the level of the longer leg.

A compact manometer is provided in which the zero point may be moved to any position desired to aline with the level of a leg. The indicia on the scale may be arranged in units of any character desired.

What I claim is:—

1. A gauge having parallel sight limbs, an indicating liquid in said limbs, and a reading scale intermediate said limbs; said scale comprising a strip with indicia thereon, a roller, said strip being passed over said roller so that a display run is provided ranging in the direction of said limbs, said roller being an operating roller engaged with said strip so as to cause the latter to travel on turning the operating roller, and means for turning said operating roller to adjustably position the indicia with relation to the indicating fluid.

2. A gauge having parallel sight gauge limbs, an indicating liquid in said limbs, and a reading scale intermediate said limbs; said scale comprising an endless band with indicia thereon, rollers, said band being passed over said rollers so that a display run is provided ranging in the direction of said limbs, one of said rollers being an operating roller to cause the band to travel on turning the operating roller, and means for turning said operating roller to adjustably position the indicia with relation to the indicating fluid.

3. A gauge having parallel sight gauge limbs, an indicating liquid in said limbs, and a reading scale intermediate said limbs; said scale comprising a strip with indicia thereon, a pair of spaced rollers, said strip being passed over said rollers so that a display run is provided ranging in the direction of said limbs, resilient means connecting the ends of said strip to provide an endless band held taut against said rollers, one of said rollers being an operating roller to cause the strip to travel on turning of the operating roller, and means for turning said operating roller to adjustably position the indicia with relation to the indicating fluid.

4. A gauge having parallel sight gauge limbs, an indicating liquid in said limbs, and a reading scale intermediate said limbs; said scale comprising an endless band with indicia thereon, spaced rollers mounted on axes extending transverse of said limbs, said band being passed over said rollers so that a display run is provided ranging in the direction of said limbs, one of said rollers being an operating roller to cause the band to travel on turning the operating roller, and means for turning said operating roller to adjustably position the indicia with relation to the indicating fluid.

5. A gauge having parallel sight gauge limbs, an indicating liquid in said limbs, and a reading scale intermediate said limbs; said scale comprising a strip with indicia thereon, a pair of spaced rollers mounted on axes extending transverse of said limbs, said strip being passed over said rollers so that a display run is provided ranging in the direction of said limbs, a tension spring connecting the ends of said strip to provide an endless band held taut against said rollers, one of said rollers being an operating roller to cause the strip to travel on turning of the operating roller, and means for turning said operating roller to adjustably position the indicia with relation to the indicating fluid.

MILTON O. JENSEN.